United States Patent

Knepp

[15] 3,688,904
[45] Sept. 5, 1972

[54] FLUSHING OF THIRD-PHASE CONTAMINANT FROM THREE-PHASE DISPERSION

[72] Inventor: James E. Knepp, Pittsburgh, Pa.

[73] Assignee: Aluminum Company of America, Pittsburgh, Pa.

[22] Filed: Dec. 28, 1970

[21] Appl. No.: 101,627

[52] U.S. Cl. .................................210/83, 210/534
[51] Int. Cl. .........................................B01d 21/24
[58] Field of Search..................210/83, 84, 532, 534

[56] References Cited

UNITED STATES PATENTS

| 1,534,145 | 4/1925 | Stedman.....................210/84 |
| 2,342,950 | 2/1944 | Lovelady et al. ........210/84 X |
| 1,481,901 | 1/1924 | Hapgood .................210/83 X |
| 2,808,933 | 10/1957 | Mobley.......................210/83 |

Primary Examiner—John Adee
Attorney—Abram W. Hatcher

[57] ABSTRACT

Use of a vertical separating tank-hydraulic leg arrangement to continuously separate the light and heavy phases of a gravity-separable three-phase dispersion containing third-phase contaminants and to flush the contaminants at intervals.

5 Claims, 1 Drawing Figure

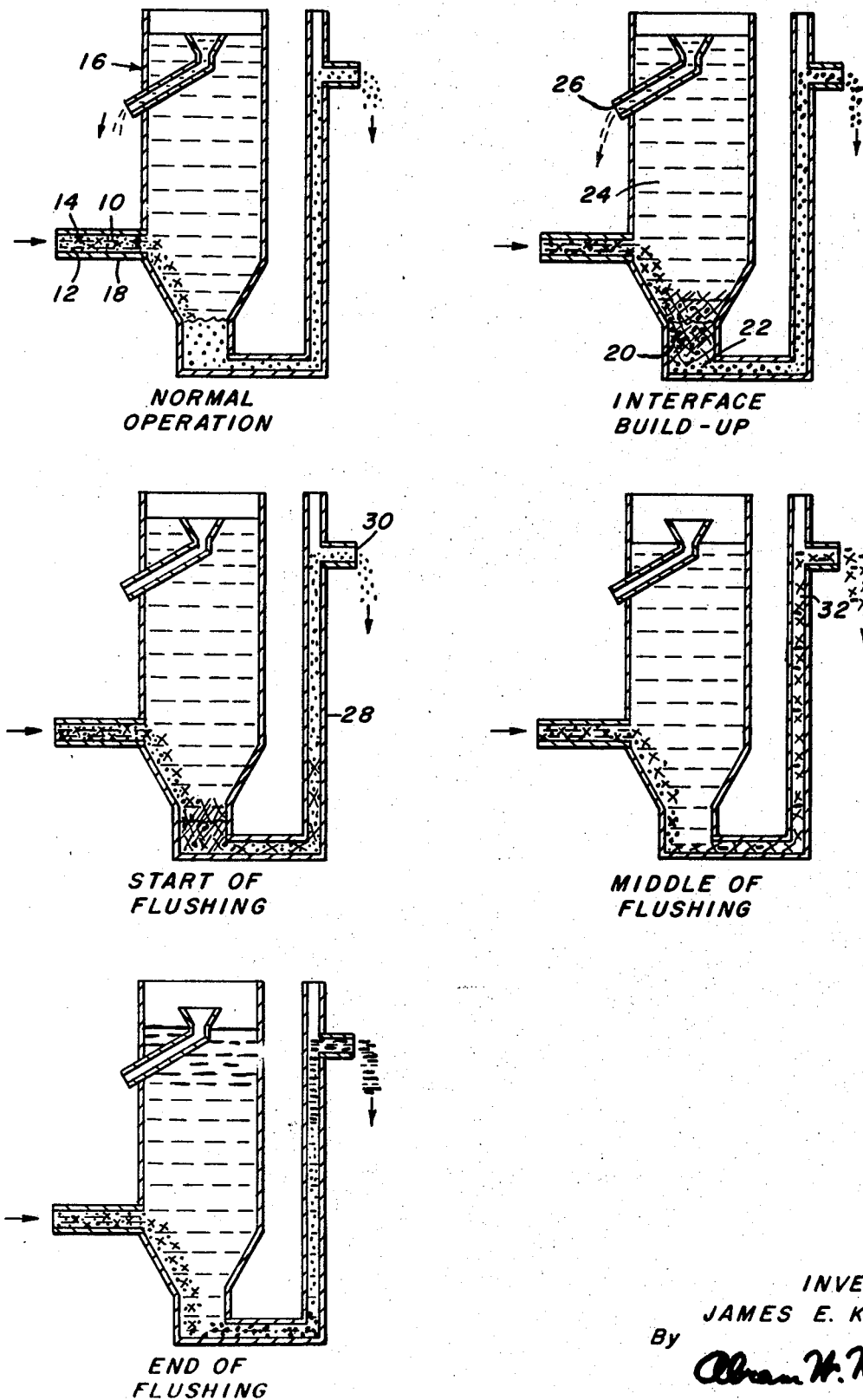

FLUSHING OF THIRD-PHASE CONTAMINANT FROM THREE-PHASE DISPERSION

BACKGROUND OF THE INVENTION

1. Field of the Invention

This invention relates to process and equipment for accomplishing continuous gravity separation of a three-phase system comprising a low-density liquid phase, for example, oil, an intermediate-density solid phase, for example, debris or contaminants dispersed in liquid from the other two phases, and a heavy-density liquid phase, for example, water.

2. Description of the Prior Art

Gravity separation of a two-phase liquid dispersion, for example, oil in water or water in oil, is known, Such may be accomplished in many types of tank designs providing for inflow of the two-phase dispersion, short holding time, and separate outflow of the two individual phases. The outflow of the heavy-liquid phase may be through a rising leg, that is, one which rises alongside the tank, of sufficient hydrostatic height to balance the total hydrostatic head of the two phases inside the tank against a slightly smaller hydrostatic head of heavy-liquid phase in the rising leg. The height of the rising leg, the height of the overflow for the light-liquid phase, and the specific gravities or densities of the two phases determine the height of an interface which is established within the tank between the two phases. The design of separating tanks is usually emperical and, to a larger degree, depends on the gravity separating rate of the particular dispersion and the desired final purity of the separated phases. The holding time generally ranges from a minimum of about 15 minutes to a maximum of about 2 hours. Often encountered in the separation of two phases are solid contaminants or debris occurring in one or both phases in substantial amounts. These form a third phase of intermediate specific gravity. This phase forms by gravity in both directions, that is, by spreading or growing upwardly and downwardly, at the aforementioned interface between the light and heavy-liquid phases.

SUMMARY OF THE INVENTION

In its broader aspects, my invention involves the flushing of a solid-contaminants phase from a dispersion made up of light-liquid, heavy-liquid and solid-contaminant phases. The flushing may be accomplished at intervals either manually or automatically. It is brought about by employing a tank which is of a greater vertical dimension, that is, height, than its largest measurement in a horizontal direction, for example, diameter or length. I will refer to this particular type of tank hereinafter as a vertical separating tank. Flushing may be facilitated according to my invention by employing a restricted area in the lowermost or bottom portion of the vertical separating tank, for example, a substantially funnel-shaped area, so that the interface between the phase of light and heavy liquids where the solid contaminants collect or form in an intermediate zone or phase which also contains some of the heavy and light liquids is held in this restricted bottom area of the tank.

According to my invention, flushing of the accumulated interface contaminant or intermediate phase is accomplished either manually or automatically by decreasing the hydrostatic support capacity of a rising heavy-liquid, for example, water, leg hereinafter referred to as the rising water leg, or simply water leg, or just leg, which exits from the bottom of the tank, for example, a leg which leaves the above-mentioned funnel-shaped portion in a U-shaped path and rises alongside the tank to a controlled overflow point. As the interface begins to form, it continues to extend its area and volume both above and below the original interface height or position. As the lowermost portion of this continuously accumulating intermediate phase reaches the bottom of the tank, it finally reaches the point where it is automatically carried over or washed into the rising water leg. Being of an intermediate specific gravity, it then begins to reduce the specific gravity of the rising water leg. This effect, in turn, reduces the hydrostatic supporting head of the rising water leg for the body of liquid in the tank. This reduction of specific gravity and consequent reduction of hydrostatic supporting head which begins the flushing may be accomplished either manually, for example, by injecting a low-density phase such as air into the rising water leg or, automatically, for example, by lowering the overflow height or point of the rising water leg, such as by opening a valve at a height lower than the standard overflow on the leg. In other words, the height or volume of the water leg is adjustable to control the level of the interface and formation of intermediate contaminants phase. Reduction of the hydrostatic supporting head of the water leg for the main tank accelerates the washing of additional intermediate specific gravity contaminant phase into the water leg. This results in an increasingly more rapid flow of all of the accumulated intermediate specific gravity or contaminant phase and the washing, pushing or flushing of solid contaminants or debris out through the rising leg, which by this time has lost substantially all of its previous hydrostatic support. Flushing continues, with the light-liquid, or oil, phase now comprising most of the flow into the water leg, until the oil level in the tank reaches or extends to almost the level of the rising water leg overflow. At this point, overflow stops, that is, after the contaminant phase has been pushed out through the rising leg overflow. The introduction of dispersion feed, which has been continued throughout the aforementioned operation, now again starts to separate the heavy-liquid, or water, phase to the bottom of the tank and light-liquid, or oil, phase to the top of the tank, with the intermediate contaminant phase once again forming by gravity between the heavy and light-liquid phases or layers. This automatically re-establishes or recommences the flushing cycle.

Representative dispersions which may be employed in the process of this invention include waste oil-water mixtures, grinding and machining soluble oils, rolling lubricant soluble oils, and mechanical lubricant soluble oils.

According to my invention a flow of the heavy-density liquid promotes automatic flushing. If the dispersion used does not have sufficient flow of heavy-density liquid because of its inherent capacity or the relative specific gravities of the other phases, heavy-density liquid, or water, may be intentionally injected into the tank to provide sufficient hydrostatic support for the light-liquid, or oil, phase or layer and to assure the automatic re-establishment of the normal separation cycle after discharge, flowing out or flushing of the intermediate contaminant phase.

According to my invention, the preferred way of supplying the three-phase dispersion feed to the vertical separating tank is by gravity. However, a low-shear pump of the like may be used. The interface is preferably held below the feed level, that is, below the point of introduction of the dispersion to the tank, to prevent percolation of the oil phase through the interface. Holding of the interface below the feed level prevents dragging of excess debris or contaminants with the oil. Positioning of the interface at the desired level is accomplished by making the heavy-liquid, or water, leg adjustable in height. In other words, the lower the overflow level or outlet point in the heavy-liquid, or water, leg, the lower will be the position or level of the interface in the tank.

Representative of the light-liquid phase of the three-phase system which the present invention is adapted to separate into components are oils, such as mineral oils, particularly those used in rolling, cutting, hydraulic and other such areas of industrial lubrication. Such light-phase liquids useful according to the invention generally have specific gravities of from about 0.75 to about 0.95 and viscosities of from about 30 to about 500 SSU/100° F. REpresentative contaminants of the intermediate phase include metallic fines, invert emulsion, soaps and other such debris. These form in an intermediate specific gravity phase at the interface between the light and heavy liquids which is of higher specific gravity than that of the lower, or light-phase, liquid which goes to the top, or forms the top layer, in the tank, that is, heavier than the representative 0.75 to 0.95 specific gravity, but, for the most part, lighter than the specific gravity of the heavy liquid that goes to the bottom, or forms the bottom layer, in the tank. The heavy-liquid and light-liquid phases may be made up of liquids other than water and oil, for example, hydrocarbon solvents, or the like, or even alcohols, or the like, provided they are sufficiently heavier than or lighter than the other component of the dispersion introduced to the tank to be capable of separation into layers by gravity. For example, the heavy liquid may be water relatively free of oil and contaminant, or a form of stable emulsion, if the oil that is being separated is an unstable or unemulsified oil.

By the tank being required to be higher in a vertical direction than it is long or wide in a horizontal direction, it is restricted in cross-section area. Preferably it is designed so as to have a portion near the bottom of smaller diameter or length, for example, a funnel-shaped section, to facilitate formation of the interface area sufficiently low in the tank for the volume of contaminants and interface debris to accumulate to a height, from top to bottom, sufficient to permit flushing according to the invention.

The dispersion treated according to the invention must be one which is sufficiently unstable for the oil and water components to be separated by gravity. For example, a broken emulsion may be used.

According t9 may invention there is a preferred relationship between the heights of phases and overflow and the specific gravities of the various phases, assuming head losses due to friction and velocity of flow through the pipes or the like to be negligible, viz., $$H_2 = \frac{H_3 \rho_H - H_1 \rho_L}{\rho_H - \rho_L}$$

$\rho L$ is the specific gravity of the light phase, $\rho H$ the specific gravity of the heavy phase, $H_1$ the height of the vertical separating tank to overflow point or upper limit of light-liquid phase, $H_2$ the height from the interface or point from which the intermediate contaminant phase forms thereabove and therebelow to the bottom of the tank and $H_3$ the height of the leg for heavy liquid to point of overflow, or exit opening or outlet, at which contaminants flow out. It is convenient in designing the tank to relate the dwell time of the light phase to the diameters and heights of various portions of the system as follows:

$$(\text{Dwell Time})_L = \frac{\pi D^2 (H_1 - H_2)}{4 \ (\text{feed rate})_L}$$

$D$ is the diameter or greatest horizontal measurement of the tank, usually the length, unless the length and width are substantially equal, in this equation, and L represents the light phase. The feed rate is indicated in cubic feet per minute and the dwell time in minutes.

The following table gives representative design and operating ranges for vertical separating tanks which I have found useful according to the invention. In addition to representative ranges for the flow velocities at various portions of the tank, representative heights involved and representative diameters which I have found useful according to the invention, a specific example of a preferred embodiment is given in the table in which the various parameters are at optimum valves. In the table, $V_1$ is the flow velocity of the entering feed, $V_2$ the flow velocity of the light, or oil, phase moving upward in the tank, $V_3$ the velocity of the downward-moving heavy, or water, phase, $V_4$ the velocity of the liquid moving upward in the water leg to the overflow point, $D_1$ the diameter of the entering dispersion feed stream orifice, $D_2$ the diameter of the larger upper portion of the generally funnel-shaped tank, such as that depicted in the drawing, which s 131 is hereinbelow, $D_3$ the diameter of the lower, or restricted-area, portion of the tank and $D_4$ the diameter of the necked heavier liquid, or water, phase overflow leg.

TABLE
Design and Operating Ranges

| Flow Velocities | | Example* |
|---|---|---|
| $V_1$ | 10–15 ft/min | 14.2 ft/min |
| $V_2$ | 0.05–0.2 ft/min | .14 ft/min |
| $V_3$ | 0.2–1.5 ft/min | .76 ft/min |
| $V_4$ | 5–50 ft/min | 13.3 ft/min |
| Heights | | |
| $H_1$ | 8–16 ft | 11 ft |
| $H_2$ | 2–4 ft | 3 ft |
| $H_3$ | Dependent on $H_1$ and $H_2$ | 9.6 ft |
| Diameters | | |
| $D_1$ | 6–10 in | 10 in |
| $D_2$ | 3–7 ft | 3 ft |
| $D_3$ | 1.5–3 ft | 3 ft |
| $D_4$ | 4–8 in | 6 in |
| Phase Contaminants | | |
| Water in oil overflow | 0–10% | .1% |
| Oil in water overflow | 1–15% | 10% |
| Dwell Time | 1–2 hours | |

*Flow Rate of 40 gpm oil/20 gpm water

BRIEF DESCRIPTION OF THE DRAWING

For a better understanding of the invention, reference will now be made to the drawing which forms a part hereof.

The drawing is a schematic representation of a vertical separating tank useful according to the invention with an adjacent hydraulic leg connected thereto for use in flushing or drainage of layers at intervals. The drawing shows the various steps of an operating sequence according to the invention from the beginning through the end of a first or illustrative cycle. In the drawing, the various steps of the process of the invention are shown, from build-up of an intermediate solid contaminant, or debris, phase or layer and the start of flushing until the re-establishment of the interface and intermediate layer before the beginning of a second flushing cycle. A dispersion or emulsion containing oil 10, water 12, and solid or particulate contaminants or impurities 14, such as metallic fines, invert emulsion, soaps, or the like, is introduced continuously to vertical separating tank 16 via line 18. With continued introduction of the emulsion, the intermediate solid contaminants (solids plus oil plus water) layer 20 begins to build up between the heavier, or lower, water layer 22 and the lighter, or upper oil, layer 24. During normal or standard operation, the oil, after build up, overflows at 26. The water layer flows out via hydraulic leg 28 at 30, and when the solid contaminants of density intermediate that of water and oil 32 are carried into rising water leg 28 as the specific gravity and hydrostatic supporting head of the rising water leg 28 are reduced, the solid contaminants are also washed out from the rising water leg 28 at 30, after flushing of the heavy, or water, layer therethrough. Then a new cycle begins, with new oil, water and solid contaminant layers forming and flushing again taking place. Before a new lower water layer forms, a small amount of oil may pass out at 30.

DESCRIPTION OF THE PREFERRED EMBODIMENT

The following example is illustrative of the invention. In this example the items $H_1$, $H_2$, $H_3$, $V_2$, $V_3$, and $V_4$ have the same meaning and significance as in the table used hereinabove.

A sample of industrial waste oil containing approximately 24 percent oil, 2 percent interface debris, and 74 percent water was used to demonstrate use of a vertical separating tank according to the invention. A tank having a total height of 17 feet and a diameter of 3 inches ID (internal diameter) was used in this example. The following data were obtained from three individual or separate trials.

|  | Trial 1 | Trial 2 | Trial 3 |
|---|---|---|---|
| Tank Temperature °F | 128 | 120 | 127 |
| Feed to Tank: |  |  |  |
| Method | pump | gravity | gravity |
| % oil | 75 | 24 | 25 |
| % interface | 2 | 1 | 1 |
| % water | 23 | 75 | 74 |
| pH | 6.25 | 6.25 | 4.0 |
| Specific Gravity | .890 | .965 | .965 |
| Oil Overflow |  |  |  |
| Height ($H_1$) in. | 158.8 | 158.8 | 158.8 |
| % water | 0.5 | 16 | 2.5 |
| Specific Gravity | .852 | .874 | .857 |
| Velocity ($V_2$) ft/min | .213 | .208 | .044 |
| Water Overflow |  |  |  |
| Height ($H_3$) in. | 149.5 | 149.5 | 149.5 |
| % Oil | 3 | 0.5 | 0.5 |
| Specific Gravity | .999 | .997 | .999 |
| Velocity ($V_3$) ft/min | 0.154 | 1.52 | 0.86 |
| Velocity ($V_4$) ft/min | 1.6 | 16.0 | 9.05 |
| Interface Height ($H_2$) in. |  |  |  |
| Visual | 30 | 16 | 34 |
| Calculated | 95.2 | 82.8 | 93.6 |
| Specific Gravity | .982 | .982 | .982 |

As the separation process or cycle continued, a third intermediate specific gravity phase (alternatively referred to as interface debris) accumulated in the area of a visual interface height. The intermediate phase increased in accumulated volume, extending in height from several inches above the tank bottom of a tank, such as depicted in the drawing and described hereinabove in connection with the table illustrating certain preferred design features thereof, to a height of approximately 40 inches. As the lower portion of the intermediate phase was carried over or washed into the water leg, a reduction of the specific gravity in the supporting water leg occurred. The reduced hydrostatic support of the water leg caused the main separating tank to flush the remaining accumulated intermediate phase through the water leg at a rapid flow until the oil level in the tank was nearly equal to the overflow height of the water leg. At that point the flow of oil from the water overflow stopped, the water phase of the feed separated to the tank bottom, and the normal operating separation cycle was re-established and continued.

While the invention has been described in terms of preferred embodiments, the claims appended hereto are intended to encompass all embodiments which fall within the spirit of the invention.

Having thus described my invention and certain embodiments thereof, I claim:

1. In a process comprising gravity separation of two liquid phases of a dispersion made up of a light-liquid phase an a heavy-liquid phase, the light-liquid phase being of a lower specific gravity than the heavy-liquid phase, by introducing a dispersion of the two phases into a settling tank which has a leg leaving the bottom thereof and rising alongside same, separating the two phases by gravity into an upper layer comprising the light liquid and a lower layer comprising the heavy liquid, and forming by gravity an intermediate phase containing solids between the two layers in the tank, the steps which comprise prior to flushing accumulating the intermediate phase containing solids in a lower restricted-area portion of the tank and flushing said intermediate phase containing solids from said tank by automatically decreasing the hydrostatic support capacity of said leg.

2. The steps of claim 1 wherein the decreasing of the hydrostatic support capacity of the leg is accomplished by positioning an overflow sufficiently low in the leg for the flushing to be accomplished automatically.

3. The steps of claim 1 wherein prior to flushing said intermediate phase is caused to gradually accumulate in depth by growing upward and downward from an original interface which forms by gravity between the heavy-liquid phase and the light-liquid phase until it is pushed over into the leg, and, as a result, the specific gravity of the rising water leg is reduced, thereby causing said decreasing of the hydrostatic supporting capacity of the leg and accelerating the washing of said intermediate phase into said leg, the accumulated intermediate phase being flowed at an increasingly more rapid rate through the leg and out of the system until the lighter phase comprises substantially all of the flow into the leg and reaches a height in the leg at which it overflows, and thereafter the light-liquid, heavy-liquid and intermediate phases in the tank are automatically re-established, whereupon the heavy-liquid phase once again begins to form in the bottom of the tank.

4. A process for separation of contaminants from a three-phase dispersion which comprises introducing a dispersion comprising a light-liquid phase, a heavy-liquid phase and solid contaminants into a separating tank of a vertical dimension which is greater than a horizontal dimension thereof, permitting the dispersion to form by gravity into three phases comprising an upper light-liquid phase, a lower heavy-liquid phase and an intermediate phase between said upper an lower phases, said intermediate phase comprising solid contaminants dispersed in a mixture of said heavy liquid and said light liquid, and flushing said intermediate phase from said tank through an outlet in a hydrostatic leg which leaves the bottom of said tank and makes a substantially U-shaped turn to continue upward alongside said tank by decreasing the hydrostatic support capacity of said leg, said tank containing a portion in the bottom thereof of lesser horizontal dimension than the remainder of the tank whereby the pushing of the heavy-liquid phase followed by the intermediate phase containing solid contaminants is facilitated.

5. A process for separation of contaminants from a three-phase dispersion which comprises introducing a dispersion comprising a light-liquid phase, a heavy-liquid phase and solid contaminants into a separating tank of a vertical dimension which is greater than a horizontal dimension thereof, permitting the dispersion to form by gravity into three phases comprising an upper light-liquid phase, a lower heavy-liquid phase and an intermediate phase between said upper and lower phases, said intermediate phase comprising solid contaminants dispersed in a mixture of said heavy liquid and said light liquid, and flushing said intermediate phase from said tank through an outlet in a hydrostatic leg which leaves the bottom of said tank and makes a substantially U-shaped turn to continue upward alongside said tank by decreasing the hydrostatic support capacity of said leg, said tank containing a portion in the bottom thereof of lesser horizontal dimension than the remainder of the tank whereby the pushing of the heavy-liquid phase followed by the intermediate phase containing solid contaminants is facilitated, the height of the intermediate phase in said tank, as measured from an interface which forms between the light-liquid phase and the heavy-liquid phase and which interface grows upward and downward from the point of formation thereof to the bottom of said tank at the point at which the leg leaves the tank being controlled so as to be substantially equal to a quantity which is the difference between the product of the height of said leg to said outlet and the specific gravity of the heavy-liquid phase and the product of the overall height of said tank to an overflow point of the light-liquid phase therein and the specific gravity of the light-liquid phase, said quantity being divided by a quantity which is the difference between the specific gravity of the heavy-liquid phase and the specific gravity of the light-liquid phase.

* * * * *